US011379024B2

(12) United States Patent
Agrawal et al.

(10) Patent No.: US 11,379,024 B2
(45) Date of Patent: Jul. 5, 2022

(54) SYSTEMS AND METHODS CAPABLE OF BYPASSING NON-VOLATILE MEMORY WHEN STORING FIRMWARE IN EXECUTION MEMORY

(71) Applicant: Micron Technology, Inc., Boise, ID (US)

(72) Inventors: Shalu Agrawal, Bangalore (IN); Ashok Kumar Yadav, Bangalore (IN); Shaileshkumar Vasu, Bangalore (IN); Vismay Ajaykumar Desai, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 278 days.

(21) Appl. No.: 16/584,261

(22) Filed: Sep. 26, 2019

(65) Prior Publication Data

US 2021/0096621 A1    Apr. 1, 2021

(51) Int. Cl.
*G06F 1/24*     (2006.01)
*G06F 11/10*    (2006.01)

(52) U.S. Cl.
CPC ............ *G06F 1/24* (2013.01); *G06F 11/1004* (2013.01)

(58) Field of Classification Search
CPC ............ G06F 9/4411; G06F 1/24; G06T 1/60
See application file for complete search history.

(56) References Cited

U.S. PATENT DOCUMENTS

| 7,562,208 | B1* | 7/2009 | Reed ................... G06F 11/1433 710/260 |
| 7,617,502 | B2* | 11/2009 | Sprague ............... G06F 9/4411 717/173 |
| 7,756,833 | B2* | 7/2010 | Van Ingen et al. .... G06G 17/30 707/640 |
| 2004/0162893 | A1* | 8/2004 | Brown .................. G06F 9/4406 709/222 |
| 2007/0055969 | A1* | 3/2007 | Yang ................... G06F 11/1433 717/168 |
| 2009/0007090 | A1* | 1/2009 | Hirao et al. .............. G06F 9/44 717/168 |
| 2009/0083733 | A1* | 3/2009 | Chen ..................... G06F 9/4408 717/178 |
| 2009/0089570 | A1* | 4/2009 | Andrianov ............ G06F 15/177 713/2 |
| 2010/0011203 | A1* | 1/2010 | Dickens .................... G06F 8/63 713/2 |
| 2010/0235484 | A1* | 9/2010 | Bolan .................... H04L 41/22 709/223 |
| 2014/0279943 | A1* | 9/2014 | Shiozawa ......... G06F 17/30371 707/690 |
| 2016/0234396 | A1* | 8/2016 | Yasukawa ............... B41J 29/38 |
| 2017/0277719 | A1* | 9/2017 | Shih ..................... G06K 9/6267 |
| 2020/0294612 | A1* | 9/2020 | Golov ..................... G11C 29/12 |

* cited by examiner

*Primary Examiner* — Raymond N Phan
(74) *Attorney, Agent, or Firm* — Fletcher Yoder, P.C.

(57) ABSTRACT

As described herein, a method performed in response to a client device undergoing an at least partial warm reset or reboot may include receiving a firmware commit request from a client device. The method may also include writing, at a first time, a firmware image associated with the client device into execution memory of volatile memory. The method may also include writing, at a second time, the firmware image associated with the client device into a memory slot of non-volatile memory.

20 Claims, 4 Drawing Sheets

SYSTEMS AND METHODS CAPABLE OF BYPASSING NON-VOLATILE MEMORY WHEN STORING FIRMWARE IN EXECUTION MEMORY

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Generally, a computing system includes processing circuitry, such as one or more processors or other suitable components, and memory devices, such as chips or integrated circuits. One or more memory devices may be implemented on a memory module, such as a dual in-line memory module (DIMM), to store data accessible to the processing circuitry. For example, based on a user input to the computing system, the processing circuitry may request that a memory module retrieve data corresponding to the user input from its memory devices. In some instances, the retrieved data may include firmware, or instructions executable by the processing circuitry to perform an operation, and/or may include data to be used as an input for the operation. In addition, in some cases, data output from the operation may be stored in memory, for example, to enable subsequent retrieval. In instances where firmware is retrieved from non-volatile memory (e.g., media, storage), a retrieval path of the information stored in memory as the firmware may be inefficient. For example, a firmware image (e.g., firmware application data) may be initially stored in a file system storage area (FSA) of volatile memory before being read to non-volatile memory and ultimately stored to execution memory (e.g., instruction random access memory (RAM)). A more efficient loading operation may be desired to improve memory management operations and reduce an image activation time.

BRIEF DESCRIPTION OF THE DRAWINGS

Various aspects of this disclosure may be better understood upon reading the following detailed description and upon reference to the drawings in which.

DETAILED DESCRIPTION

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, hardware of a computing system includes processing circuitry and memory, for example, implemented using one or more processors and/or one or more memory devices (e.g., chips or integrated circuits). During operation of the computing system, the processing circuitry may perform various operations (e.g., tasks) by executing corresponding instructions, for example, based on a user input to determine output data by performing operations on input data. To facilitate operation of the computing system, data accessible to the processing circuitry may be stored in a memory device, such that the memory device stores the input data, the output data, data indicating the executable instructions, or any combination thereof.

Additionally, in some instances, memory devices may be implemented using different memory types. For example, a memory device may be implemented as volatile memory, such as dynamic random-access memory (DRAM) or static random-access memory (SRAM). Alternatively, the memory device may be implemented as non-volatile memory, such as flash (e.g., NAND, NOR) memory, phase-change memory (e.g., 3D XPoint™), or ferroelectric random access memory (FeRAM). In any case, memory devices generally include at least one memory die (e.g., an array of memory cells configured on a portion or "die" of a semiconductor wafer) to store data bits (e.g., "0" bit or "1" bit) transmitted to the memory device through a channel (e.g., data channel, communicative coupling, bus interface) and may be functionally similar from the perspective of the processing circuitry even when the memory devices include different memory types.

In some cases, the instructions executed from memory may interact with or affect firmware. Computing device firmware may facilitate command or instruction translation between software and hardware. For example, firmware may be operable according to Assembly or another suitable form of relatively low-level programming language. In this way, firmware may help to define a software and/or application to be run on a host device (e.g., client device).

During operation of the host device, a situation may arise that may cause the host device to need to be rebooted, or restarted. When the host device is to be restarted without turning off (e.g., warm reset), firmware running on the host device may be stored in non-volatile memory. During the warm reset and before firmware is executed and/or operational on the host device, an image of the firmware may be loaded into execution memory of a volatile memory of the host device. In this way, the firmware may be moved from a host device to a file system storage area (FSA) of a memory slot within volatile memory to non-volatile memory and back to execution memory within the volatile memory. Improvements to an operation of memory may occur when the firmware is moved to execution memory at least partially before storing the firmware into the non-volatile memory. For example, storing the firmware into execution memory without first storing the firmware into the non-volatile memory may reduce an image activation time of the firmware during the warm reset.

As described herein, a memory controller may store a firmware image into the FSA memory slot and move the firmware image from the FSA memory slot into the non-volatile memory and the execution memory without any intervening storage operations. The moving (and storing) of the firmware may occur at an at least partially similar time. In this way, the firmware image is not moved to non-volatile memory storage before being moved and stored in the execution memory. The firmware image is executed from the execution memory. Since the firmware image is not saved in the non-volatile memory before being saved into the execution memory, a firmware activation time associated with a reapplication of the firmware to the host device is reduced. A lower firmware activation time may improve memory operations because host device downtime during the warm reset is reduced.

Figures 1, 2:
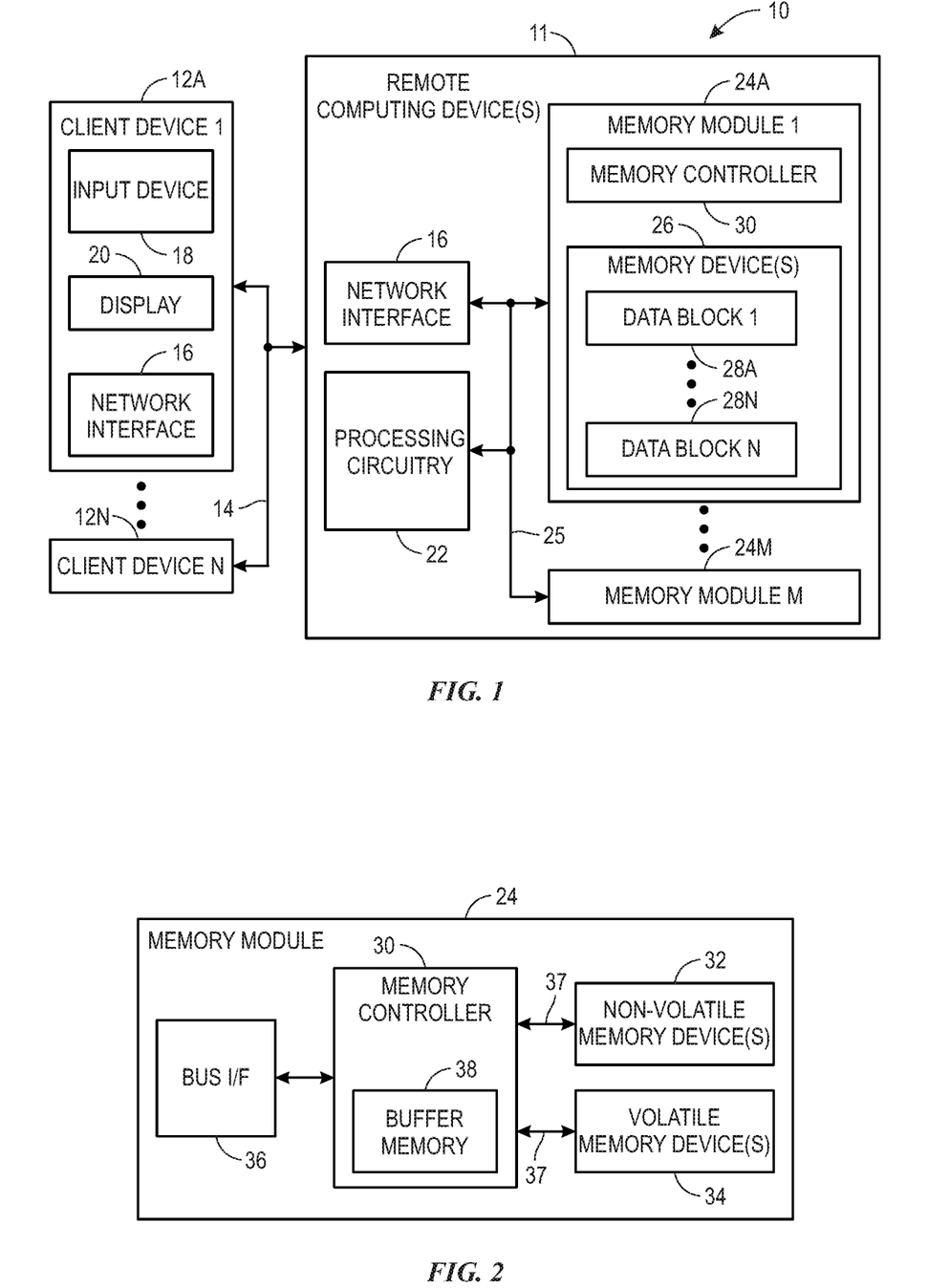
FIG. 1 is a block diagram of a computing system that includes client devices and one or more computing devices, in accordance with an embodiment.
FIG. 2 is a block diagram of a memory module that may be implemented in a computing device of FIG. 1, in accordance with an embodiment.

To help illustrate, FIG. 1 depicts an example of a computing system 10, which includes one or more remote computing devices 11. As in the depicted embodiment, the remote computing devices 11 may be communicatively coupled to the one or more client devices 12 via a communication network 14. It should be appreciated that the depicted embodiment is merely intended to be illustrative and not limiting. For example, in other embodiments, the remote computing devices 11 may be communicatively coupled to a single client device 12 or more than two client devices 12. Furthermore, depending on the computing system 10, the memory controller 30 may not be just on the memory module 24. In this way, depicted is a generic use of the described techniques where the memory controller 30 is wholly on the memory module 24. However, other examples may include a memory controller without a memory module and/or may use processing circuit 22 as the memory controller 30.

In any case, the communication network 14 may enable data communication between the client devices 12 and the remote computing devices 11. In some embodiments, the client devices 12 may be physically remote (e.g., separate) from the remote computing devices 11, for example, such that the remote computing devices 11 are located at a centralized data center. Thus, in some embodiments, the communication network 14 may be a wide area network (WAN), such as the Internet. To facilitate communication via the communication network 14, the remote computing devices 11 and the client devices 12 may each include a network interface 16.

In addition to the network interface 16, a client device 12 may include input devices 18 and/or an electronic display 20 to enable a user to interact with the client device 12. For example, the input devices 18 may receive user inputs and, thus, may include buttons, keyboards, mice, trackpads, and/or the like. Additionally or alternatively, the electronic display 20 may include touch sensing components that receive user inputs by detecting occurrence and/or position of an object touching its screen (e.g., surface of the electronic display 20). In addition to enabling user inputs, the electronic display 20 may facilitate providing visual representations of information by displaying a graphical user interface (GUI) of an operating system, an application interface, text, a still image, video content, or the like.

As described above, the communication network 14 may enable data communication between the remote computing devices 11 and one or more client devices 12. In other words, the communication network 14 may enable user inputs to be communicated from a client device 12 to a remote computing device 11. Additionally or alternatively, the communication network 14 may enable results of operations performed by the remote computing device 11 based on the user inputs to be communicated back to the client device 12, for example, as image data to be displayed on its electronic display 20.

In fact, in some embodiments, data communication provided by the communication network 14 may be leveraged to make centralized hardware available to multiple users, such that hardware at client devices 12 may be reduced. For example, the remote computing devices 11 may provide data storage for multiple different client devices 12, thereby enabling data storage (e.g., memory) provided locally at the client devices 12 to be reduced. Additionally or alternatively, the remote computing devices 11 may provide processing for multiple different client devices 12, thereby enabling processing power provided locally at the client devices 12 to be reduced.

Thus, in addition to the network interface 16, the remote computing devices 11 may include processing circuitry 22 and one or more memory modules 24 (e.g., sub-systems) communicatively coupled via a data bus 25. In some embodiments, the processing circuitry 22 and/or the memory modules 24 may be implemented across multiple remote computing devices 11, for example, such that a first remote computing device 11 includes a portion of the processing circuitry 22 and the first memory module 24A, while an Mth remote computing device 11 includes another portion of the processing circuitry 22 and the Mth memory module 24M. Additionally or alternatively, the processing circuitry 22 and the memory modules 24 may be implemented in a single remote computing device 11.

In any case, the processing circuitry 22 may generally execute instructions to perform operations, for example, indicated by user inputs received from a client device 12. Thus, the processing circuitry 22 may include one or more central processing units (CPUs), one or more graphics processing units (GPUs), one or more processor cores, or any combination thereof. In some embodiments, the processing circuitry 22 may additionally perform operations based on circuit connections formed (e.g., programmed) in the processing circuitry 22. Thus, in such embodiments, the processing circuitry 22 may additionally include one or more application specific integrated circuits (ASICs), one or more field programmable logic arrays (FPGAs), or any combination of suitable processing devices.

Additionally, a memory module 24 may provide data storage accessible to the processing circuitry 22. For example, a memory module 24 may store data received from a client device 12, data resulting from an operation performed by the processing circuitry 22, data to be input to the operation performed by the processing circuitry 22, instructions executable by the processing circuitry 22 to perform the operation, or any combination thereof. To facilitate providing data storage, a memory module 24 may include one or more memory devices 26 (e.g., chips or integrated circuits). In other words, the memory devices 26 may each include a tangible, non-transitory, computer-readable medium that stores data accessible to the processing circuitry 22.

Since hardware of the remote computing devices 11 may be utilized by multiple client devices 12, at least in some instances, a memory module 24 may store data corresponding to different client devices 12. In some embodiments, the data may be grouped and stored as data blocks 28. In fact, in some embodiments, data corresponding with each client device 12 may be stored as a separate data block 28. For example, the memory devices 26 in the first memory module 24A may store a first data block 28A corresponding with the first client device 12A and an Nth data block 28N corresponding with the Nth client device 12N. One or more data blocks 28 may be stored within a memory die of the memory device 26.

Additionally or alternatively, in some embodiments, a data block 28 may correspond to a virtual machine (VM) provided to a client device 12. In other words, as an illustrative example, a remote computing device 11 may provide the first client device 12A a first virtual machine via the first data block 28A and provide the Nth client device 12N an Nth virtual machine via the Nth data block 28N. Thus, when the first client device 12A receives user inputs intended for the first virtual machine, the first client device 12A may communicate the user inputs to the remote computing devices 11 via the communication network 14. Based at least in part on the user inputs, the remote computing device 11 may retrieve the first data block 28A, execute instructions to perform corresponding operations, and communicate the results of the operations back to the first client device 12A via the communication network 14.

Similarly, when the Nth client device 12N receives user inputs intended for the Nth virtual machine, the Nth client device 12N may communicate the user inputs to the remote computing devices 11 via the communication network 14. Based at least in part on the user inputs, the remote computing device 11 may retrieve the Nth data block 28N, execute instructions to perform corresponding operations, and communicate the results of the operations back to the Nth client device 12N via the communication network 14. Thus, the remote computing devices 11 may access (e.g., read and/or write) various data blocks 28 stored in a memory module 24.

To facilitate improving access to stored data blocks 28, a memory module 24 may include a memory controller 30 that controls storage of data in its memory devices 26. In some embodiments, the memory controller 30 may operate based on circuit connections formed (e.g., programmed) in the memory controller 30. Thus, in such embodiments, the memory controller 30 may include one or more application specific integrated circuits (ASICs), one or more field programmable logic gate arrays (FPGAs), or any combination of suitable processing devices. In any case, as described above, a memory module 24 may include memory devices 26 that implement different memory types, for example, which provide varying tradeoffs between data access speed and data storage density. Thus, in such embodiments, the memory controller 30 may control data storage across multiple memory devices 26 to facilitate leveraging the various tradeoffs, for example, such that the memory module 24 provides fast data access speed as well as high data storage capacity.

To help illustrate, FIG. 2 depicts an example of a memory module 24 including different types of memory devices 26. In particular, the memory module 24 includes one or more non-volatile memory devices 32 and one or more volatile memory devices 34. In some embodiments, the volatile memory devices 34 may be implemented as dynamic random-access memory (DRAM) and/or static random-access memory (SRAM). In other words, in such embodiments, the memory module 24 may include one or more DRAM devices (e.g., chips or integrated circuits), one or more SRAM devices (e.g., chips or integrated circuits), or any combination of suitable memory devices.

Additionally, in some embodiments, the non-volatile memory devices 32 may be implemented as flash (e.g., NAND) memory, phase-change (e.g., 3D XPoint™) memory, and/or FeRAM. In other words, in such embodiments, the memory module 24 may include one or more NAND memory devices, one or more 3D XPoint™ memory devices, one or more FeRAM memory devices, or any combination of suitable memory devices. In fact, in some embodiments, the non-volatile memory devices 32 may provide storage class memory (SCM), which, at least in some instance, may facilitate reducing implementation associated cost, for example, by obviating other non-volatile data storage devices in the computing system 10.

In any case, in some embodiments, the memory module 24 may be implemented by disposing each of the non-volatile memory devices 32 and the volatile memory devices 34 on a flat (e.g., front and/or back) surface of a printed circuit board (PCB). To facilitate data communication via the data bus 25, the memory module 24 may include a bus interface 36 (bus I/F). For example, the bus interface 36 may include data pins (e.g., contacts) formed along an (e.g., bottom) edge of the printed circuit board. Thus, in some embodiments, the memory module 24 may be a single in-line memory module (SIMM), a dual in-line memory module (DIMM), or the like.

Additionally, in some embodiments, the bus interface 36 may include logic that enables the memory module 24 to communicate via a communication protocol implemented on the data bus 25. For example, the bus interface 36 may control timing of data output from the memory module 24 to the data bus 25 and/or interpret data input to the memory module 24 from the data bus 25 in accordance with the communication protocol. Thus, in some embodiments, the bus interface 36 may be a double data rate fourth-generation (DDR4) interface, a double data rate fifth-generation (DDR5) interface, a peripheral component interconnect express (PCIe) interface, a non-volatile dual in-line memory module (e.g., NVDIMM-P) interface, a cache coherent interconnect for accelerators (CCIX) interface, or the like.

In any case, as described above, a memory controller 30 may control data storage within the memory module 24, for example, to facilitate improving data access speed and/or data storage efficiency by leveraging the various tradeoffs provided by memory types implemented in the memory module 24. Thus, as in the depicted example, the memory controller 30 may be coupled between the bus interface 36 and the memory devices 26 via one or more internal buses 37, for example, provided as conductive traces formed on the printed circuit board. For example, the memory controller 30 may control whether a data block 28 is stored in the non-volatile memory devices 32 or in the volatile memory devices 34. In other words, the memory controller 30 may transfer a data block 28 from the non-volatile memory devices 32 into the volatile memory devices 34 or vice versa.

To facilitate data transfers, the memory controller 30 may include buffer memory 38, for example, to provide temporary data storage. In some embodiments, the buffer memory 38 may include static random-access memory (SRAM) and, thus, may provide faster data access speed compared to the volatile memory devices 34 and the non-volatile memory devices 32. The buffer memory 38 may be DRAM or FeRAM in some cases. Additionally, to facilitate accessing stored data blocks 28, the memory module 24 may include an address map and/or other parameters stored in the buffer memory 38, a non-volatile memory device 32, a volatile memory device 34, a dedicated address map memory device 26, or any combination thereof. The other parameters may include a physical experience table that stores parameters and/or data related to operation of the memory module 24 and/or one or more components of the computing system 10.

In addition, the remote computing device 11 may communicate with a service processor and/or a service bus included in or separate from the processing circuitry 22 and/or the data bus 25. The service processor, processing circuitry 22, and/or the memory controller 30 may perform error detection operations and/or error correction operations (ECC), and may be disposed external from the remote computing device 11 such that error detection and error correction operations may continue if power to the remote computing device 11 is lost. For simplicity of description, the operations of the service processor are described as being included in and performed by the memory controller 30, but it should be noted that in some embodiments the error correction operations or data recovery operations may be employed as functions performed by the service processor, processing circuitry 22, or additional processing circuitry located internal or external to the remote computing device 11 or the client device 12.

The memory module 24 is depicted in FIG. 2 as a single device that includes various components or submodules. In some examples, a remote computing device may include one or several discrete components equivalent to the various devices, modules, and components that make up the memory module 24. For instance, a remote computing device may include non-volatile memory, volatile memory, and a controller positioned on one or several different chips or substrates. In other words, the features and functions of the memory module 24 need not be employed in a single module to achieve the benefits described herein.

Figure 3A:
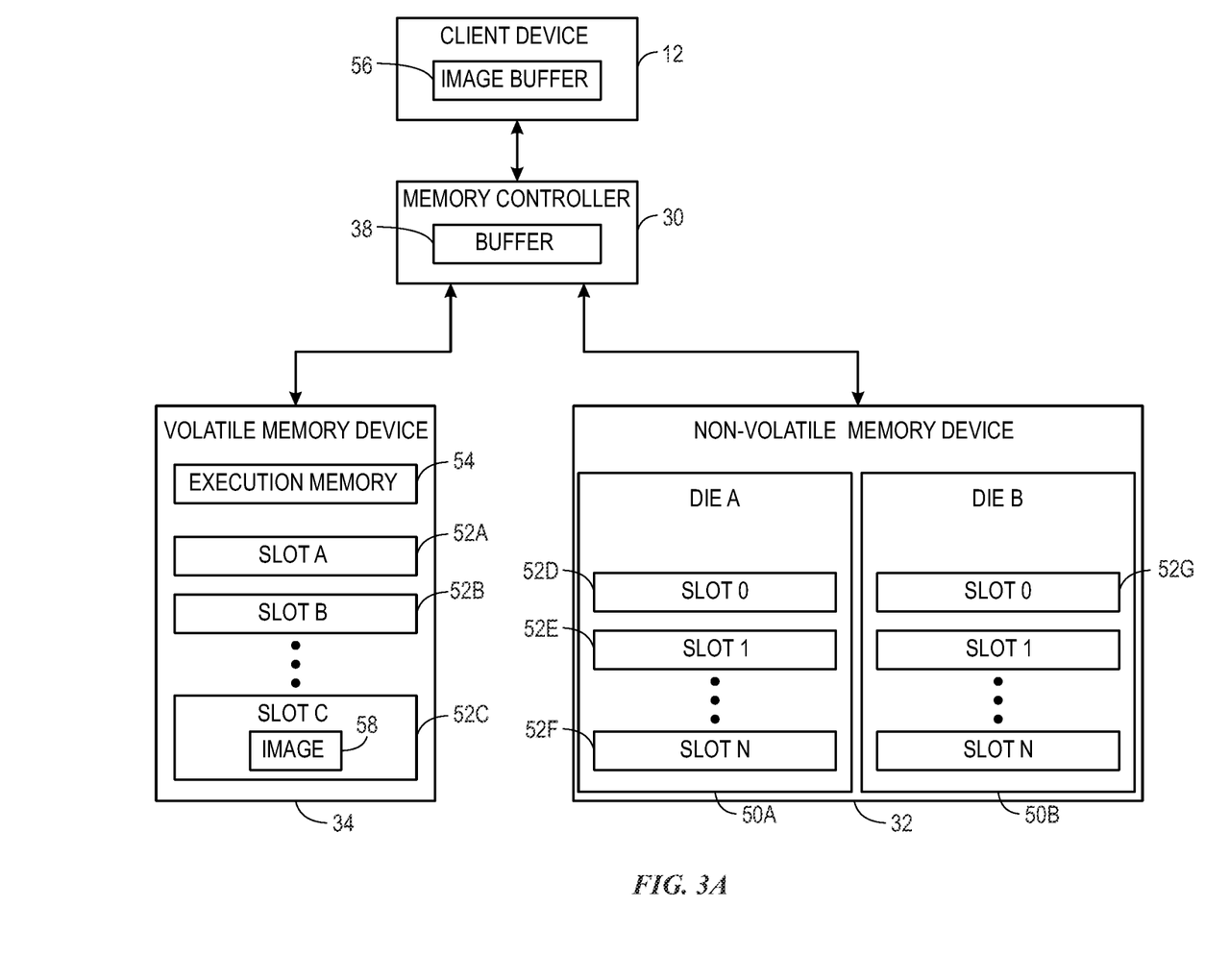
FIG. 3A is a block diagram of the memory module of FIG. 2 storing a firmware image before being stored in execution memory, in accordance with an embodiment.

To help illustrate, FIG. 3A depicts an example of the memory module 24 that includes one or more of the memory devices 26 (e.g., up to an N number of memory devices 26), each including non-volatile (e.g., non-volatile memory device 32) or volatile memory (e.g., volatile memory device 34) infrastructure based on the particular application. Each memory device 26 may store a segment of data corresponding to a memory address in a memory slot 52 (e.g., memory slot 52A, memory slot 52B, and so on). A particular memory device 26 may include any number of memory die 50 (e.g., memory die 50A, memory die 50B, and so on) each having memory slots 52. The segment of data stored by the memory device 26 may be smaller than the overall size of the memory slot 52. For example, the segment of data may be 512 bytes (B) while the entire memory die 50 may store several gigabytes. It should be appreciated that the depicted example is merely intended to be illustrative and not limiting.

In any case, with regard to the depicted embodiments shown in FIG. 3A, the processing circuitry 22 and/or the memory controller 30 may facilitate communication between the memory devices 26 and the client device 12 via channels. Each memory device 26 stores a particular amount of data accessible to the client device 12. When the stored data corresponds to firmware (e.g., firmware running or supporting an operation of the client device 12 and/or firmware to be used to run or support an operation of the client device 12), it is referred to as a firmware image, where the firmware image is a subset of data read or written to the memory device 26 within a same memory operation.

Before firmware may be suitably used after a warm reset operation of the client device 12 (e.g., host device), the firmware is to be stored into execution memory 54. To do so, the memory controller 30 may write a firmware image from an image buffer 56 of the client device 12 and into the buffer memory 38. The memory controller 30 may store the firmware image from the buffer memory 38 into a memory slot 52 (e.g., memory slot 52C as firmware image 58). As depicted in FIG. 3A, the firmware image has already been stored by the memory controller 30 into the memory slot 52C as the firmware image 58. Memory operations that directly write the firmware image 58 from the memory slot 52C into execution memory 54 may be more efficient (e.g., take less time, use fewer processing resources) than memory operations that write the firmware image 58 from the memory slot 52C into an additional memory location before storing the firmware image 58 into the execution memory 54.

Figure 3B:
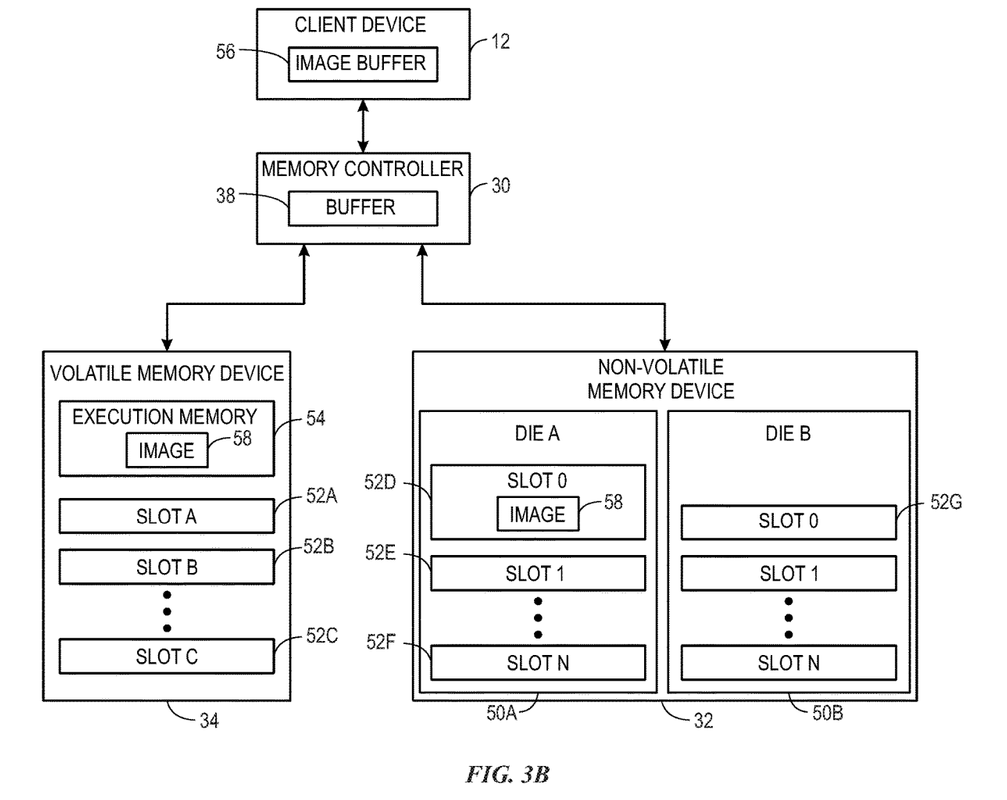
FIG. 3B is a block diagram of the memory module of FIG. 2 after storing the firmware image of FIG. 3A in the execution memory, in accordance with an embodiment.

For example, FIG. 3B depicts an example of the memory module 24 that has written the firmware image 58 from the memory slot 52C into execution memory 54 without necessarily writing the firmware image 58 to non-volatile memory device 32 before writing the firmware image 58 to execution memory 54. It should be understood that the firmware image 58 may be stored in any of the memory slots 52, in addition to the execution memory 54 at an end of firmware activation operations.

The firmware image activation operation depicted via FIG. 3A and FIG. 3B may be performed in response to a firmware image activation command generated to update, for example, a host controller interface and/or storage protocol used to transfer data between enterprise and client systems (e.g., between remote computing devices 11 and client devices 12), such as non-volatile memory express (NVMe). By using the control methods described herein an activation time of the firmware image 58 (e.g., a time duration between transmission of an update command to runtime of the updated firmware image 58) may be reduced.

The control methods described herein may activate a new firmware image 58 not by loading a firmware image 58 from the non-volatile memory device 32, but instead by using a firmware image 58 stored in the volatile memory device 34. This approach may use an additional buffer in the volatile memory device 34 to keep the firmware image 58 intact for a next (e.g., subsequent) firmware image activation operation. In this way, the firmware of the client device 12 may maintain at least two buffers in the volatile memory (e.g., via volatile memory device 34). One buffer may store the firmware image 58 which has been activated and/or committed by the client device 12, and the second buffer is to keep the firmware images 58 which have been downloaded but not committed by the client device 12.

In general, referring to FIGS. 3A and 3B, a firmware download command may initiate a transfer of data of the firmware image 58 from the client device 12 to the first buffer of the volatile memory device 34. The firmware download command may complete when all the data of the firmware image 58 is downloaded to the volatile memory device 34. A firmware commit (e.g., activation) command instructs the memory controller 30 to verify a signature of the firmware image 58 stored in the volatile memory device 34 (e.g., a buffer of the volatile memory device 34). After verification of the signature of the firmware image 58, the memory controller 30 may use a file system storage area (FSA) to store the firmware image 58 in execution memory 54 of the volatile memory device 34. The FSA may correspond or include one or more of the memory slots 52, such as the memory slot 52C. The firmware download command may complete when the firmware image 58 is stored in one of the memory slots 52. In this example, the firmware may keep the buffer of the volatile memory device 34 intact until a next firmware commit command. If additional download commands are to be addressed while the first buffer is to be kept intact, the memory controller 30 may reference the second buffer of the volatile memory device 34.

For activating the firmware image 58, the memory controller 30 may verify that a memory slot 52 storing the firmware image 58 matches with a firmware memory slot parameter in a firmware commit command. If the memory slots 52 match, the memory controller 30 may continue on to verify an image header and a signature and/or perform cyclic redundancy check (CRC) operations. This verification operation may help the memory controller 30 to confirm that the firmware image 58 is of a suitable quality to be loaded into execution memory 54 for use by the client device 12. If the verification succeeds, the memory controller 30 may load the firmware image 58 into execution memory 54. In some embodiments, the memory controller 30 matching may occur in association with the firmware. For example, the firmware may provide instructions as commands to the memory controller 30 to perform some or all of the aforementioned operations to the firmware image 58.

Figure 4:
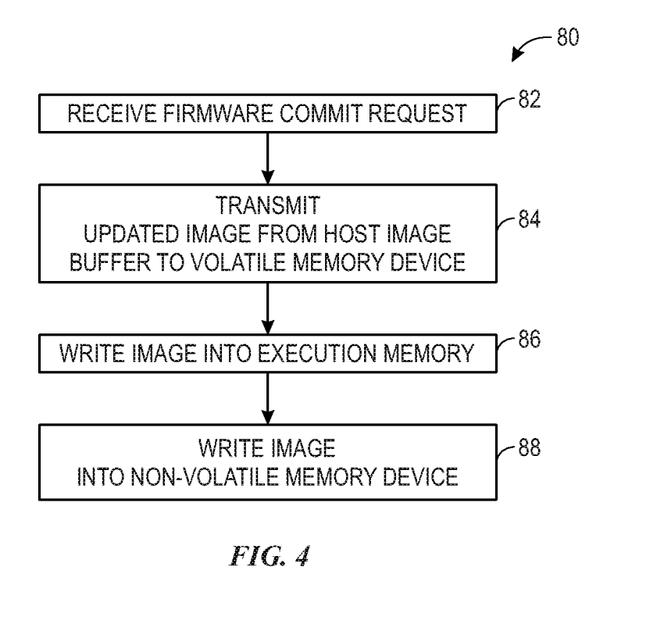
FIG. 4 is a flowchart of a process for loading the firmware image of FIG. 3A into the execution memory, in accordance with an embodiment.

To help explain, FIG. 4 is a flowchart of a process 80 for loading the firmware image 58 during a warm reset. The memory controller 30 is described below as performing the process 80, but it should be understood that any suitable processing circuitry may additionally or alternatively perform the process 80. Furthermore, although the process 80 is described below as being performed in a particular order, it should be understood that any suitable order may be used to perform individual operations of the process 80.

Generally, the process 80 includes a memory controller receiving a firmware commit request (block 82), transmitting an updated image from a host image buffer to a volatile memory device (block 84), writing the image into an execution memory (block 86), and storing the image into a non-volatile memory device (block 88).

Thus, at block 82, the memory controller 30 may receive a firmware commit request. The firmware commit request may be a command (e.g., control signal) transmitted from a controller of the client device 12, such as in response to a system crash or other event. In some operational situations, a portion of the client device 12 and/or the firmware of the client device 12 may be desired to be reset or restarted while a second portion of the client device 12 remains powered-on and operational (e.g., a warm reset instead of a cold reset, where the client device 12 is restarted from a powered-off state). In this situation, firmware of the client device 12 may be backed up (e.g., an image of the firmware stored in the non-volatile memory device 32) to be retrieved after the warm reset completes. The firmware commit request may specify which memory slot 52 to store a firmware image 58 of the client device 12 in memory. The firmware commit request may also include an image header defining other parameters associated with the firmware image 58, and the image activation of the firmware image 58.

At block 84, the memory controller 30 may transmit an updated image from the image buffer 56 to the volatile memory device 34. A controller of the client device 12 may write the firmware image 58 to the image buffer 56 in response to determining to transmit the firmware commit request. When the memory controller 30 receives the firmware commit request, the memory controller 30 writes data corresponding to the updated image from the image buffer 56 into a memory slot 52. Any suitable memory slot 52 may be used in volatile memory, for example memory slot 52C.

In some embodiments, the memory controller 30 may verify data integrity of the firmware image 58 before proceeding with the process 80. To be valid and have suitable data integrity, a written firmware image 58 may be verified to have its data start at offset zero, be contiguous, and not include any overlapping regions of data. In this way, after storing the firmware image 58 into the memory slot 52, the memory controller 30 may verify a signature of the written firmware image 58. This may be performed as part of a validation operation. The memory controller 30, to verify written firmware image 58, may compare the memory slot 52 storing the firmware image 58 to a memory slot parameter of the firmware commit request. If the memory slot parameter matches the memory slot 52 that stores the firmware image 58, the memory controller 30 may continue on to verify the image header and signature of the firmware image 58, such a cryptographic hash or a digital signature. Furthermore, in some embodiments, the memory controller 30 performs a CRC operation on the firmware image 58 stored in the memory slot 52 to verify suitable writing occurred. If the validation operations succeed, the memory controller 30 may proceed with the process 80. If the validation operations do not succeed, the memory controller 30 may rewrite the firmware image 58 from the image buffer 56.

At block 86, the memory controller 30 may write the firmware image 58 into the execution memory 54. The memory controller 30 may read the firmware image 58 from the memory slot 52 of the volatile memory device 34 and write the firmware image 58 into the execution memory 54 without having to store the firmware image 58 into non-volatile memory device 32 as part of an intervening operation. Removing the intervening operation of writing the firmware image 58 into non-volatile memory device 32 may reduce an activation time associated with rebooting the firmware image of the client device 12.

At block 88, the memory controller 30 may write the firmware image 58 into the non-volatile memory device 32. The memory controller 30 may write the firmware image 58 into a memory slot 52 of the non-volatile memory device 32, such as memory slot 52D. In either operations of block 84 or block 88, the firmware image 58 may occupy one or more memory slots 52, thus the memory controller 30 may repeat writing operations to write a complete firmware image 58 to memory. Since the operations of block 88 are not required to occur before the operations of block 86, the firmware image 58 may be written into execution memory 54 at the same time as being written into the non-volatile memory device 32. Other suitable combinations of timing may be permitted via these system and methods of the memory controller 30. For example, the firmware image 58 may be completely written to the execution memory 54 before writing is initiated of the firmware image 58 into the non-volatile memory device 32. Furthermore, in some cases the memory controller 30 may start writing the firmware image 58 to both the non-volatile memory device 32 and the execution memory 54 at the same time but one operation may complete before the other operation.

Thus, technical effects of the present disclosure include facilitating improved memory writing operations to reduce an activation time of a firmware image during a warm reset of a client device. To do so, a controller may be configurable to write an image from the client device from a memory slot in volatile memory into execution memory in the volatile memory without an intervening operation of writing the image into a memory slot (e.g., firmware slot) in non-volatile memory before writing in execution memory. The memory slot of the volatile memory may be a file system area used to store the image to a firmware slot in the non-volatile memory. With this is mind, the memory controller may write the firmware image to the execution memory at a time not later than a time of completing a writing of the firmware image to non-volatile memory (e.g., the writing of the firmware image to non-volatile memory does not have to finish before writing of the firmware image to execution memory may begin).

With these technical effects in mind, multiple memory devices may be implemented on a memory module, thereby enabling the memory devices to be communicatively coupled to the processing circuitry as a unit. For example, a dual in-line memory module (DIMM) may include a printed circuit board (PCB) and multiple memory devices. Memory modules respond to commands from a memory controller communicatively coupled to a client device or a host device via a communication network. Or in some cases, a memory controller may be implemented on the host-side of a memory-host interface; for example, a processor, microcontroller, FPGA, ASIC, or the like may each include a memory controller. This communication network may enable data communication there between and, thus, the client device to utilize hardware resources accessible through the memory controller. Based at least in part on user input to the client device, processing circuitry of the memory controller may perform one or more operations to facilitate the retrieval or transmission of data between the client device and the memory devices. Data communicated between the client device and the memory devices may be used for a variety of purposes including, but not limited to, presentation of a visualization to a user through a graphical user interface (GUI) at the client device, processing operations, calculations, or the like. Thus, with this in mind, the above-described improvements to memory controller operations and memory writing operations may manifest as improvements in visualization quality (e.g., speed of rendering, quality of rendering), improvements in processing operations, improvements in calculations, or the like.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An apparatus, comprising:
   a volatile memory device comprising:
   an execution memory configured to store a firmware image at a first time for retrieval at a second time later than the first time; and
   a memory slot;
   a non-volatile memory device; and
   a memory controller configured to be coupled to an image buffer of a client device and configured to:
   write, at the first time, the firmware image stored within the image buffer to the execution memory;
   write, at a third time, the firmware image into the non-volatile memory device, wherein the third time is not earlier than the first time;
   verify whether the firmware image stored in the execution memory comprises valid data at least in part by performing a cyclic redundancy check (CRC) operation; and
   in response to verifying the firmware image comprises the valid data, writing the firmware image to the image buffer of the client device in response to receiving a notification that a warm reset of the client device has completed.

2. The apparatus of claim 1, wherein the execution memory is configured to store the firmware image for retrieval after completion of the warm reset, wherein the warm reset is a reset of the client device communicatively coupled to the volatile memory device where the client device is not powered-off.

3. The apparatus of claim 1, wherein the memory controller is configured to:
   receive a command generated based at least in part on the firmware image, wherein the command is referenced while the firmware image is written to the memory slot; and
   store the firmware image into the memory slot based on the command specifying the memory slot.

4. The apparatus of claim 1, wherein the non-volatile memory device comprises at least one of flash memory, NAND memory, phase-change memory, 3D XPoint™ memory, or ferroelectric random access memory, or any combination thereof.

5. The apparatus of claim 1, wherein the memory controller is configured to write the firmware image from the image buffer to the memory slot before writing the firmware image into the execution memory.

6. The apparatus of claim 1, wherein the execution memory is configured to store the firmware image before the non-volatile memory device stores the firmware image.

7. The apparatus of claim 3, wherein the command specifies the memory slot from a plurality of memory slots of the volatile memory device, and wherein a memory slot parameter of the command is used to verify whether a written firmware image stored in the memory slot comprises the valid data.

8. The apparatus of claim 3, wherein the memory controller is configured to store at least a portion of the firmware image into the memory slot and a remaining portion of the firmware image into an additional memory slot of the volatile memory device.

9. A method, comprising:
   receiving a firmware commit request from a client device;
   writing, at a first time, a firmware image defining an operation of a portion of the client device into execution memory of volatile memory;
   writing, at a second time, the firmware image into a memory slot of non-volatile memory; and
   writing the firmware image into the memory slot of the non-volatile memory after a first portion of the firmware image is written into the execution memory.

10. The method of claim 9, comprising:

performing a cyclic redundancy check (CRC) operation to verify that a written firmware image comprises the firmware image, wherein the written firmware image is stored in the execution memory of the volatile memory after the first time.

11. The method of claim 9, comprising:

writing the firmware image from an image buffer of a client device to a memory slot of the volatile memory before writing the firmware image into the execution memory of the volatile memory.

12. The method of claim 9, comprising:

writing the firmware image to the execution memory before writing the firmware image to the non-volatile memory.

13. The method of claim 10, comprising:

performing additional verification operations on the written firmware image comprising at least one of the following:
- verifying a header of the written firmware image;
- verifying a cryptographic header of the written firmware image;
- verifying a signature of the written firmware image;
- verifying data of the written firmware image starts at zero;
- verifying the data of the written firmware image comprises contiguous data; or
- verifying the data of the written firmware image does not comprise overlapping regions portions of the data.

14. A system, comprising:

processing circuitry configured to be coupled to an image buffer of an external device; and a memory comprising one or more tangible, non-transitory, machine-readable media and configured to store instructions executable by the processing circuitry, wherein upon execution of the instructions, the processing circuitry is configured to:
- receive a firmware commit request from a client device;
- write a firmware image from the client device into a memory slot of volatile memory based at least in part on the firmware commit request;
- write, at a first time, the firmware image into an execution memory separate from a non-volatile memory, wherein the firmware image is transmitted from the memory slot of the volatile memory into the execution memory; and
- write, at a second time, the firmware image into the non-volatile memory, wherein the second time is after the first time, wherein the second time is sufficiently after the first time such that all the firmware image is written into the execution memory before the second time.

15. The system of claim 14, wherein the processing circuitry is also configured to:
- read a memory slot parameter of the firmware commit request;
- verify the memory slot equals the memory slot parameter; and
- in response to the memory slot equaling the memory slot parameter, write the firmware image into the execution memory separate from non-volatile memory, wherein the firmware image is transmitted from the memory slot of the volatile memory into the execution memory.

16. The system of claim 14, wherein the non-volatile memory comprises 3D XPoint™ memory.

17. The system of claim 14, wherein the processing circuitry is configured to:
write the firmware image from the image buffer to the memory slot of the volatile memory.

18. The system of claim 14, wherein the processing circuitry is configured to:
perform a cyclic redundancy check (CRC) operation to verify data of the firmware image written to the execution memory.

19. The system of claim 14, wherein the external device comprises a host device.

20. The system of claim 18, wherein the processing circuitry is configured to perform additional verification operations on the firmware image written to the execution memory comprising at least one of:
- verifying a header of the firmware image written to the execution memory;
- verifying a cryptographic header of the firmware image written to the execution memory;
- verifying a signature of the firmware image written to the execution memory;
- verifying data of the firmware image written to the execution memory starts at zero;
- verifying the data of the firmware image written to the execution memory comprises contiguous data; or
- verifying the data of the firmware image written to the execution memory does not comprise overlapping regions portions of the data.

* * * * *